US008429290B2

(12) United States Patent
Sedlak et al.

(10) Patent No.: US 8,429,290 B2
(45) Date of Patent: *Apr. 23, 2013

(54) BROADBAND TRANSMISSION SYSTEM AND METHOD

(75) Inventors: Brian Sedlak, Highlands Ranch, CO (US); Thomas Lemmons, Evergreen, CO (US); Gary Rasmussen, Parker, CO (US); Ian Zenoni, Highlands Ranch, CO (US); Thomas Huber, Parker, CO (US)

(73) Assignee: OpenTV, Inc., San Francisco, CA (US)

( * ) Notice: Subject to any disclaimer, the term of this patent is extended or adjusted under 35 U.S.C. 154(b) by 149 days.

This patent is subject to a terminal disclaimer.

(21) Appl. No.: 12/984,413

(22) Filed: Jan. 4, 2011

(65) Prior Publication Data

US 2011/0099288 A1 Apr. 28, 2011

Related U.S. Application Data

(63) Continuation of application No. 10/067,460, filed on Feb. 4, 2002, now Pat. No. 7,870, 283.

(60) Provisional application No. 60/266,335, filed on Feb. 2, 2001.

(51) Int. Cl.
*G06F 15/16* (2006.01)
*H04N 7/173* (2011.01)

(52) U.S. Cl.
USPC ........... 709/233; 709/232; 709/234; 709/235; 725/105; 725/118

(58) Field of Classification Search .................. 709/233, 709/232, 234, 235; 725/105, 118
See application file for complete search history.

(56) References Cited

U.S. PATENT DOCUMENTS

| 5,533,034 | A | 7/1996 | Kuwata et al. |
| 5,559,810 | A | 9/1996 | Gilbert et al. |
| 5,566,175 | A | 10/1996 | Davis |
| 5,572,442 | A | 11/1996 | Schulhof et al. |
| 5,631,694 | A | 5/1997 | Aggarwal et al. |
| 5,826,031 | A | 10/1998 | Nielsen |
| 5,845,090 | A | 12/1998 | Collins, III et al. |
| 5,845,279 | A | 12/1998 | Garofalakis et al. |
| 5,956,716 | A | 9/1999 | Kenner et al. |
| 6,023,722 | A | 2/2000 | Colyer |

(Continued)

FOREIGN PATENT DOCUMENTS

WO WO-02063803 A2 8/2002

OTHER PUBLICATIONS

"U.S. Appl. No. 10/067,460 , Final Office Action mailed Dec. 24, 2009", 15 Pgs.

(Continued)

*Primary Examiner* — Hoang-Vu A Nguyen-Ba
(74) *Attorney, Agent, or Firm* — Schwegman Lundberg & Woessner, P.A.

(57) ABSTRACT

Disclosed is a system that optimizes transmission bandwidth of a broadband transmission system such as a cable television, satellite system, or wireless information service. Requests for content items from users are employed to add or delete content items from a list. Content items in the list are ranked relative to the number of requests received or by rate of request. Package groups are created with most requested content items being broadcast more frequently than less requested content items. Transmit groups are produced from package groups and placed in a broadcast queue. A transmit process transmits groups retrieved from the queue.

19 Claims, 6 Drawing Sheets

U.S. PATENT DOCUMENTS

| | | | |
|---|---|---|---|
| 6,134,596 | A | 10/2000 | Bolosky et al. |
| 6,247,058 | B1 | 6/2001 | Miller et al. |
| 6,389,457 | B2 | 5/2002 | Lazaridis et al. |
| 6,879,768 | B1 | 4/2005 | Ono et al. |
| 7,301,944 | B1 | 11/2007 | Redmond |
| 7,661,119 | B1 | 2/2010 | Arsenault et al. |
| 7,870,283 | B2 | 1/2011 | Sedlak et al. |
| 2002/0087688 | A1 | 7/2002 | Kamentsky et al. |
| 2002/0108117 | A1 | 8/2002 | Sedlak et al. |
| 2006/0050659 | A1 | 3/2006 | Corson et al. |
| 2006/0259944 | A1 | 11/2006 | Tash |

OTHER PUBLICATIONS

"U.S. Appl. No. 10/067,460, Advisory Action mailed Jan. 18, 2008", 3 pgs.

"U.S. Appl. No. 10/067,460, Advisory Action mailed Mar. 10, 2010", 3 pgs.

"U.S. Appl. No. 10/067,460, Examiner Interview Summary mailed Feb. 9, 2010", 3 pgs.

"U.S. Appl. No. 10/067,460, Final Office Action mailed Oct. 24, 2007", 10 pgs.

"U.S. Appl. No. 10/067,460, Non Final Office Action mailed May 18, 2007", 10 pgs.

"U.S. Appl. No. 10/067,460, Non-Final Office Action mailed May 13, 2008", 13 pgs.

"U.S. Appl. No. 10/067,460, Non-Final Office Action mailed May 29, 2009", 13 pgs.

"U.S. Appl. No. 10/067,460, Non-Final Office Action mailed Apr. 14, 2010", 13.

"U.S. Appl. No. 10/067,460, Non-Final Office Action mailed on Dec. 23, 2008", 12 pgs.

"U.S. Appl. No. 10/067,460, Response filed Mar. 11, 2009 to Non-Final Office Action mailed Dec. 23, 2008", 10 pgs.

"U.S. Appl. No. 10/067,460, Response filed Aug. 15, 2007 to Non Final Office Action mailed May 18, 2007", 11 pgs.

"U.S. Appl. No. 10/067,460, Response filed Aug. 31, 2009 to Non Final Office Action mailed May 29, 2009", 10 pgs.

"U.S. Appl. No. 10/067,460, Response filed Oct. 14, 2008 to Non-Final Office Action mailed May 13, 2008", 9 pgs.

"U.S. Appl. No. 10/067,460, Response filed Dec. 20, 2007 to Final Office Action mailed Oct. 24, 2007", 8 pgs.

"U.S. Appl. No. 10/067,460, Response filed Feb. 24, 2010 to Final Office Action mailed Dec. 24, 2009", 11 pgs.

"U.S. Appl. No. 10/067,460, Response filed Aug. 16, 2010 to Non Final Office Action mailed Apr. 14, 2010", 8 pgs.

"U.S. Appl. No. 10/067,460 Notice of Allowance mailed Sep. 30, 2010", 6 pgs.

BROADBAND TRANSMISSION SYSTEM AND METHOD

CROSS REFERENCE TO RELATED APPLICATIONS

This application is a Continuation of U.S. application Ser. No. 10/067,460, filed on Feb. 4, 2002, which claims the benefit of priority of U.S. Provisional Application No. 60/266,335, filed Feb. 2, 2001, which applications are incorporated herein by reference in their entirety.

BACKGROUND OF THE INVENTION a. Field of Invention

The present invention pertains generally to broadband networks and more specifically to a method of efficiently utilizing available bandwidth to provide video, streaming media image and information desired by users of a broadband network.

b. Description of the Background

Broadband is a form of data transmission in which a single medium, such as a wire, cable or satellite link, for example, can carry several channels at once. In contrast, baseband transmission allows only one signal at a time. Cable television systems use broadband transmission for television program distribution. In addition to program content such as television programs, cable systems may also provide Internet connections employing cable modems. Cable system Internet support employs both upstream and downstream data transfers. Such data transfers may also be employed to support interactive television. Interactive television may furnish viewers additional information such as a news item display or a stock ticker that may be scrolled across the bottom of the screen, for example. Cable system data transmissions may comprise both isochronous and asynchronous transfers. Isochronous transfers are constant data rate transfers as may be used for streaming audio and video where a regular data transfer rate is needed to maintain picture or audio quality. Asynchronous transfers may vary in data rate and may exhibit burstiness as channel bandwidth becomes available. A cable system typically employs isochronous transfers for program content such as movies and may support isochronous transfers to support QoS (Quality of Service) data transfer modes as specified by DOCSIS (Data Over Cable System Interface Specification). Asynchronous transfers are employed for other data services, such as DOCSIS 'best effort' modes, and data transfer rate may vary with the number of users, size of files being transferred, and bandwidth allocated to isochronous transfer. The bandwidth of a cable system is divided among broadcast programs, subscriber services, and Internet data transfers. Internet or interactive television users may subscribe to news and data services where information may be sent to users at some regular interval or in response to a particular event. Further, users may log on to services that provide less than real time video, such as cameras showing weather or traffic for example. As the number of modem users or interactive users increase, system performance may decrease, resulting in a reduction in service that may result in reduced customer satisfaction or reduced revenues. In order to optimize revenue and maintain customer satisfaction, a method of network management is needed that optimizes data services to a large base of users while preserving a level of service quality.

SUMMARY OF THE INVENTION

The present invention overcomes the disadvantages and limitations of the prior art by providing a system and method for dynamically controlling the content and frequency of transmission of data elements over a network.

The present invention may therefore comprise a method for transmitting requested content items in a broadband transmission system comprising: receiving requests for a plurality of content items on an upstream path of the broadband transmission system; creating a list of the content items; creating a request count for each content item of the plurality of content items; sorting the requests using the count; and transmitting content items with a higher count more frequently than content items with a lower count.

The present invention may further comprise a system for optimizing bandwidth utilization in a broadband transmission system comprising: a first database containing a plurality of content items; a second database containing user request information for the content items; a transmit unit; a server computer; and a software program that processes the request information received across the broadband transmission system and determines a rate of request for each content item of the plurality of content items in the first database and establishes a frequency of transmission for each content item of the plurality of content items in the first database responsive to the rate of request for each content item of the plurality of content items in the first database.

An advantage of the present invention is that it allows selection and transmission of content items to users over a broadband network in a highly efficient manner. By transmitting some content items less frequently, bandwidth is made available which may be used to support additional users or to provide a wider variety of content items, providing an opportunity for increased revenue and greater user satisfaction. Content items may comprise news, weather, stock information and broadcast programs such as movies. Users may submit requests to add or delete content items through an on-screen menu, Internet website or other interface. Requests are processed by the system of the present invention to produce a list of requested content items and the number of times each content item has been requested. Content items for which there are no requests are removed from the list of requested content items. Content items are sorted relative to the number of requests made for that content item and placed in transmit packages. Transmit packages may include minimum content request information such that only content items which have a request count greater than a predetermined number are placed in that transmit package. Content items that have a lower request count are broadcast less frequently than content items that have a higher request count number of requests. For example, if sports scores are shown across the bottom of a displayed image, scores for teams for which there are more requests will be displayed more frequently than scores for teams for which there are fewer requests.

Transmit packages are further processed by a transmit process which determines the transmit time needed for each package. Packages are supplied to a transmit queue and are transmitted. The system and method of the present invention may be implemented as part of a cable television system operator server, or may be implemented on a separate server.

The invention may also be used to create part of a higher bandwidth transmission stream. For example, the system and method of the present invention may be used to organize and control the content of stock quotes supplied to a broadcaster from a news service that are then displayed in a lower portion of the screen during newscasts. The present invention may be used to determine the frequency of broadcast of content items based on the duration of content items, the frequency of request of the content items, and the bandwidth available for broadcast of the content items. In this manner, if a broadcaster provides a substantially constant bandwidth for broadcast of news, for example, the system and method of the present invention may provide a set of content items and broadcast frequency such that the provided bandwidth is utilized without dead time when no content items are displayed.

Depending on available bandwidth, the system and method of the present invention may be used to transmit only those content items for which there is some minimum number of requests. The invention is applicable but not limited to audio programming, video programming, and data transmission. The invention may also be employed to manage data transmission to wireless data devices.

BRIEF DESCRIPTION OF THE DRAWINGS

In the figures.

DETAILED DESCRIPTION OF THE INVENTION

Figure 1:
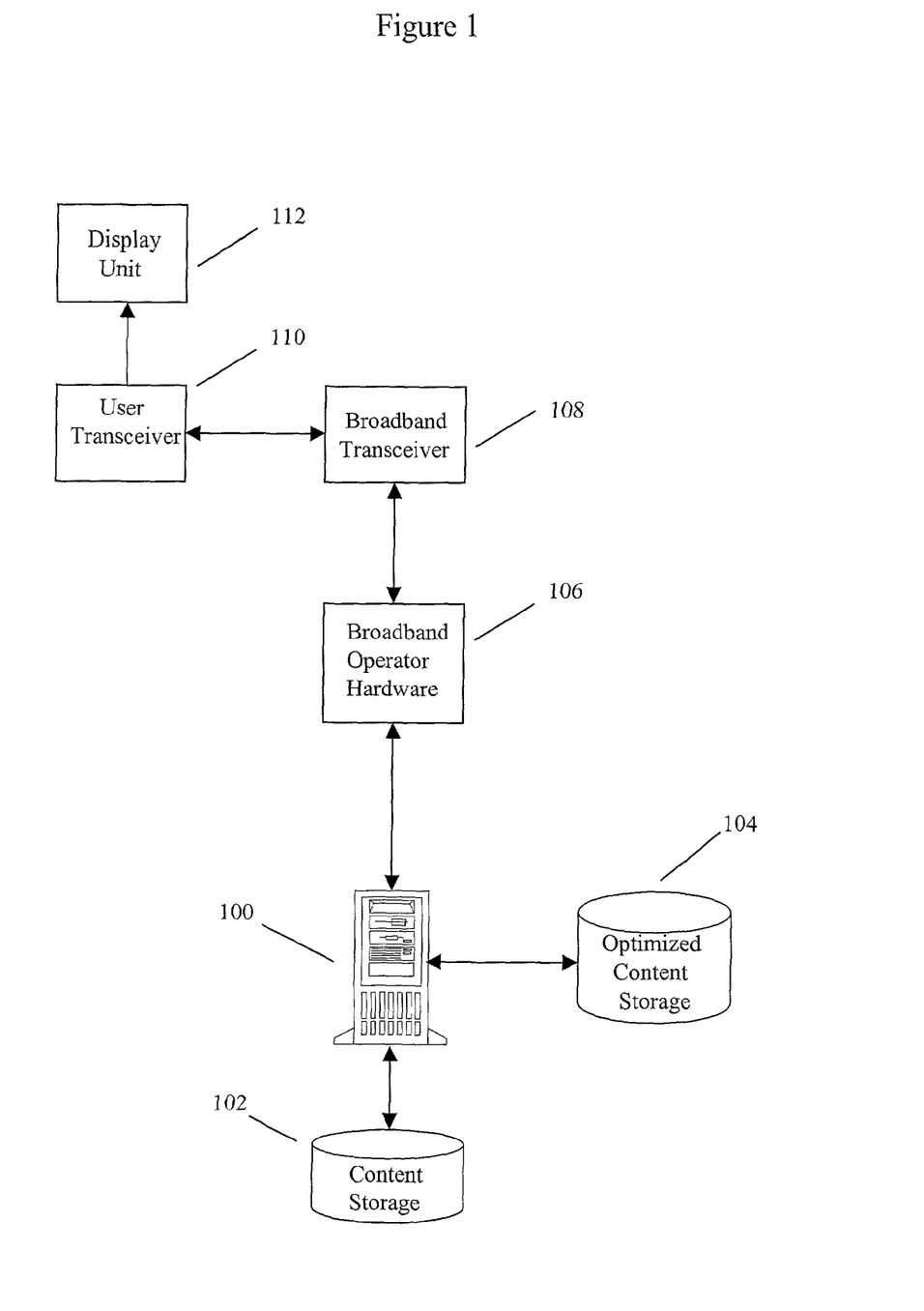
FIG. 1 is a system overview block diagram.

FIG. 1 is a system overview block diagram. Display unit 112 and user transceiver 110 allow the user to view program content and to interact with the system of the present invention. Display unit 112 may be a television, computer monitor or other device. User transceiver 110 may be a set top box, modem, satellite interface or other device. User transceiver 110 communicates with broadband transceiver 108 and may be used to make requests for content items. Broadband transceiver 108 communicates with broadband operator hardware 106 which may be equipment operated by a cable television company. Broadband operator hardware 106 communicates with bandwidth optimization server 100 that processes content items requests from users. Bandwidth optimization server 100 utilizes content storage 102 to create optimized content that may be stored in optimized content storage 104. Alternatively, optimized content storage 104 may contain an index or listing of optimized content that then may be retrieved from content storage 102. Bandwidth optimization server 100 transfers optimized content to broadband operator hardware 106 for transmission to users through broadband transceiver 108.

Figure 2:
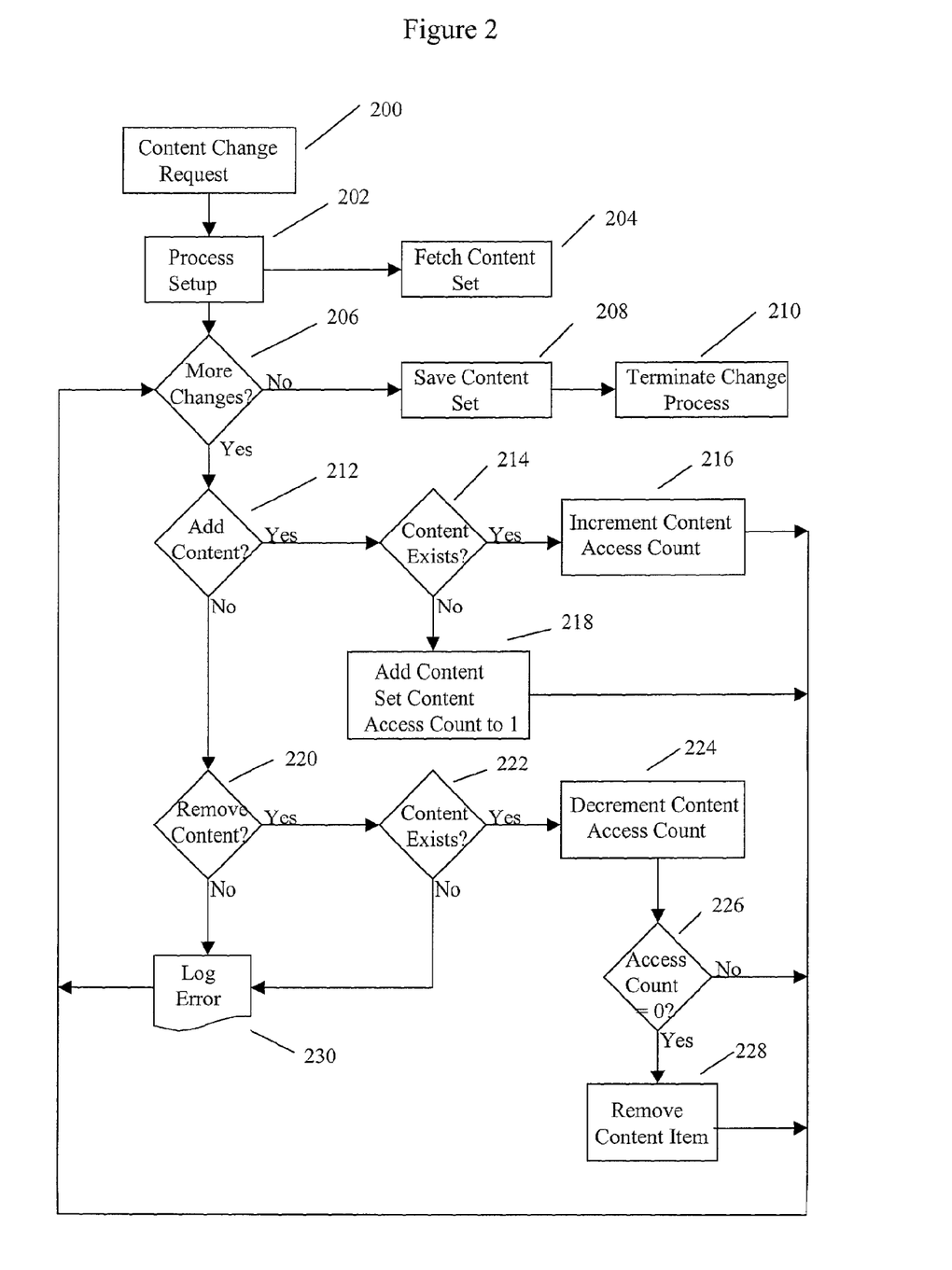
FIG. 2 depicts a flowchart for a content filter process.

FIG. 2 depicts a flowchart for a content filter process. The content filter process adds or removes content items from the content set and provides a count of the number of requests for each content item. Users submit content requests using all on-screen menu, Internet connection, or other method that result in a content change request 200. Processing of content change request 200 begins with process setup step 202 which performs fetch content set step 204 and may perform other tasks such as locking the current content set and other actions such that broadcast of content may continue while the content set is updated. Step 206 checks if there are more changes. When all changes have been made, step 208 saves the content set and step 210 terminates the change process. Terminating the change process may include actions to unlock and use the current content set for broadcast. When all changes have not been made, step 206 routes changes to step 212 where the change is examined to see if it is an add content change. If the result of step 212 is that the change is an add content change, step 214 checks if the content item exists in the current content set. If the result of step 214 is that the item is already in the content set, increment content access count step 216 is performed. Processing then returns to step 206 which checks if there are more changes. If the result of step 214 is that the content item is not in the current content set, step 218 adds the content item to the content set and sets the access count to one. Processing then returns to step 206 which checks if there are more changes. If the result of step 212 is that the change is not an add content change, step 220 checks if the change is to remove content. If the change is not to remove content, error log step 230 saves change information and processing returns to step 206. If step 220 determines that the change is to remove content, step 255 checks if the content item exists in the current content set. If the content does not exist in the current content set, error log step 230 saves change information and processing returns to step 206. If step 222 determines that the content does exists in the current content set, step 260 decrements the content access count. Step 226 checks if the content access count is equal to zero. If the result of step 226 is that the access count is not zero, processing returns to step 206. If the result of step 226 is that the content access count is equal to zero, step 228 removes the content item from the current content set. Processing then returns to step 206.

Figure 3:
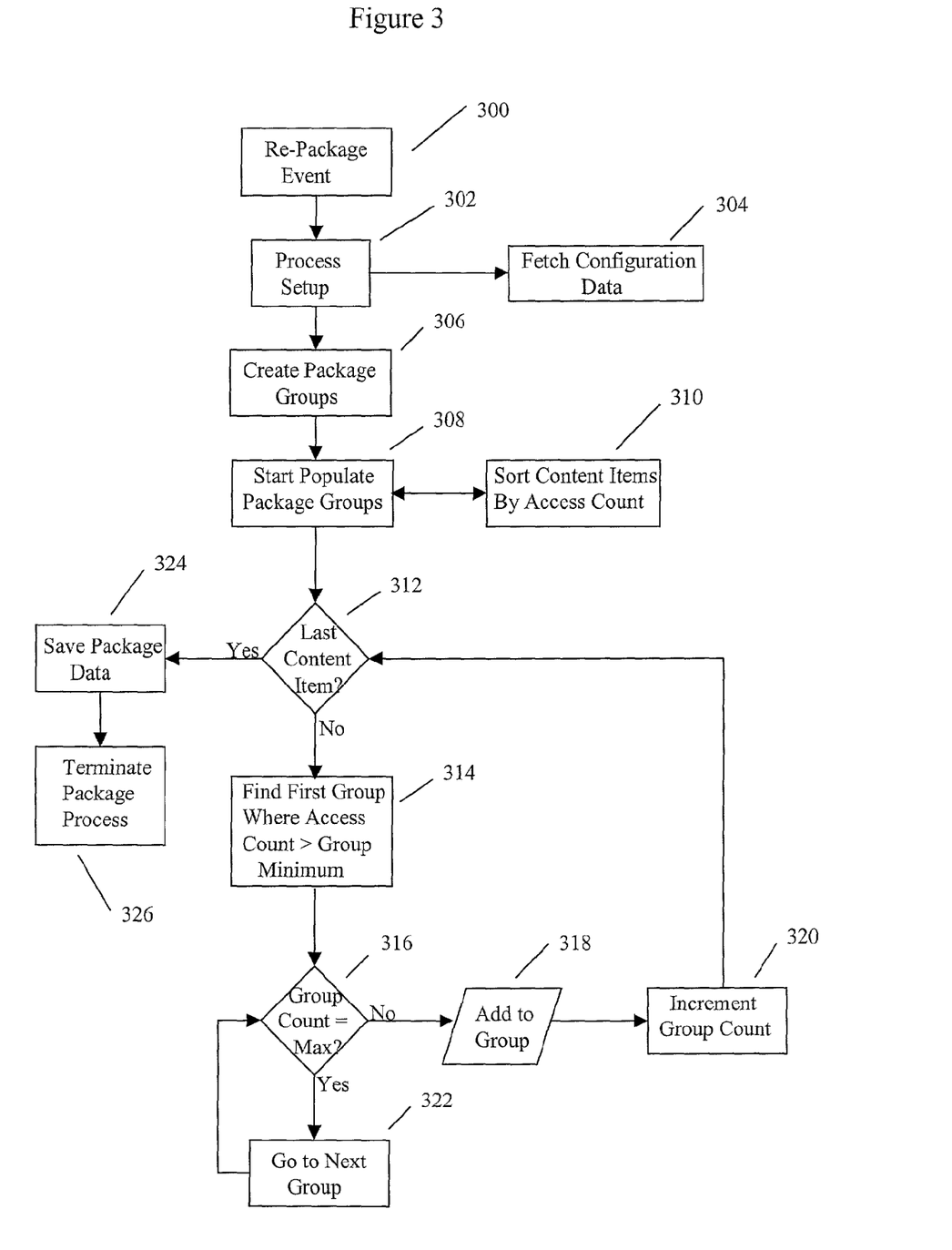
FIG. 3 depicts a flowchart for content group packaging.

FIG. 3 depicts a flowchart for content group packaging. Content group packaging assembles most frequently requested content items into package groups for broadcast. Content group packaging employs content information including access count and duration, plus available bandwidth of the broadcast system. Repackaging occurs whenever scheduled by a broadband operator. Repackage event 300 invokes process setup step 302 which performs fetch configuration data step 304 and may include other actions such as data set locking to support broadcast with previous configuration data while configuration data is updated. Configuration data may include the maximum number of packages to create, the maximum package size, and maximum bandwidth timing that may be used to calculate retransmission repeat rates for each package. At step 306, package groups are created using the configuration data fetched in step 304. At step 308, the package groups are populated using content items sorted by access count in step 310. Each package group contains information for the package retransmit rate, the package priority, the package size, the maximum package size and the minimum content request count. The package retransmit rate indicates how often the package should be transmitted and may be calculated or may be assigned a value through configuration. The package priority indicates the priority of the package that reflects the position of the package when sorted by access count in step 310. Step 312 checks if the last content item has been placed in a package group. If the result of step 312 is that the last content item has not been placed in a group, step 314 examines groups and finds the first group where the access count of the content item is greater than the minimum access count for that group, thereby providing for content items with higher access counts to be grouped in the same group. Step 316 examines the group found in step 314 to determine if the current group count plus the size of the content item size exceeds the maximum package size. If the result of step 316 is that the maximum package size is not exceeded, the item is added to the group in step 318 and the group count is incremented in step 320. Processing then continues at step 312. If the result of step 316 is that the maximum group count would be exceeded, step 322 selects the next group and step 316 is again performed. Steps 316 and 322 are performed until a group is found that has sufficient remaining size to include the content item. When step 312 determines that the last content item has been processed, step 324 saves the package data.

Step 326 terminates the package process. Terminating the package process may include actions to unlock the data and make it available for use in broadcast.

Figure 4:
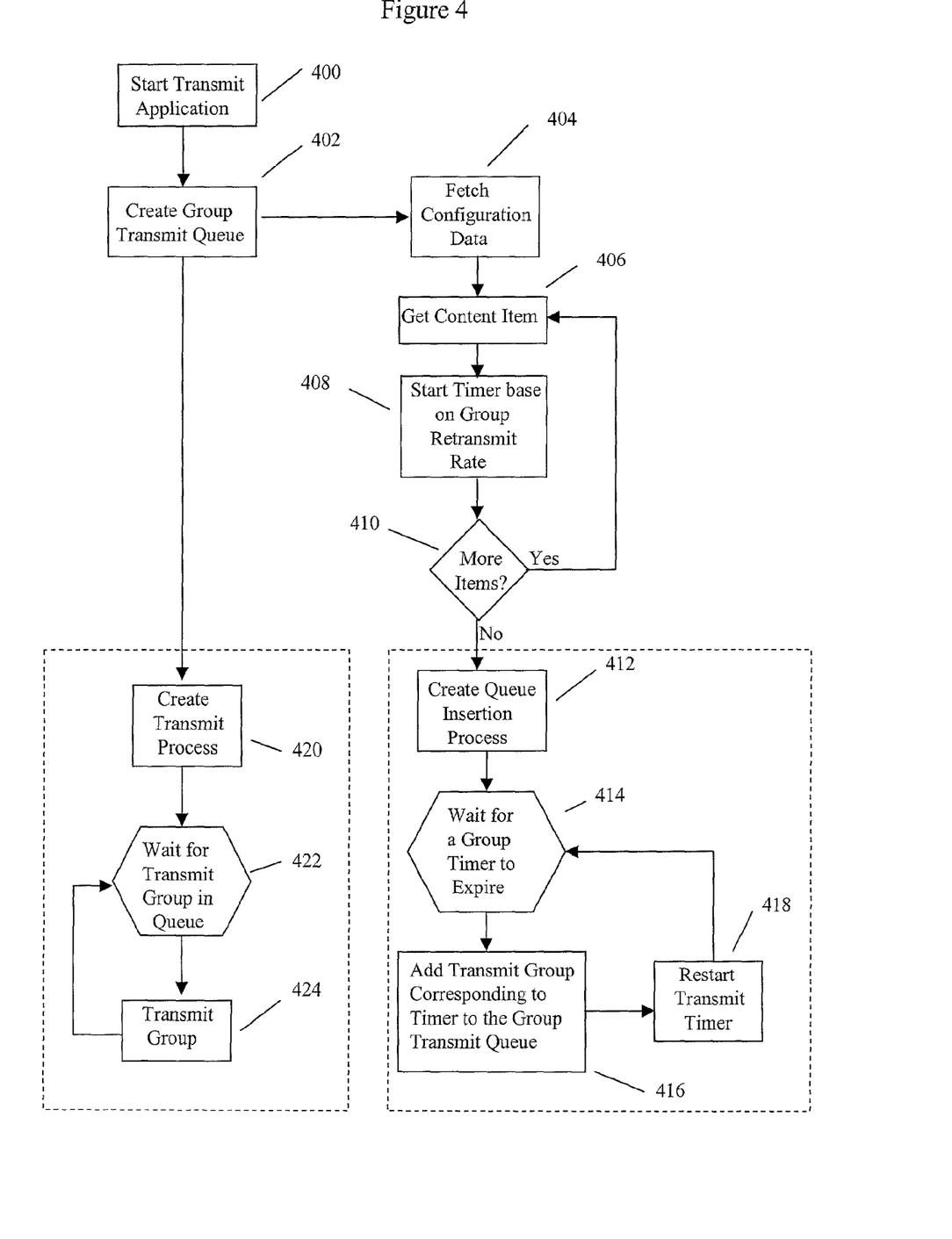
FIG. 4 depicts a flowchart for group transmission.

FIG. 4 depicts a flowchart for group transmission. Package group transmission is the process of supplying package groups to the broadband system for transmission to users. Start transmit application 400 first performs step 402 to create a group transmit queue. Creating a group transmit queue may employ concurrent processes as depicted by dotted outline in FIG. 4. Steps 420 to 424 comprise a process that may operate concurrently with steps 412 through 418. Step 404 fetches configuration data that includes the number of groups, group timing information, the group priority and the group retransmit rate. Step 406 retrieves a content item from a group. Step 408 creates time information for each package group. Step 410 determines if more content items exist in the group. If more items exist in the group, step 406 gets the next content item from the group and step 408 adds time information from the content item. When step 410 determines that all content items have been processed, timer information is passed to queue insertion process step 412. Step 414 waits for a group timer to expire. When a group timer expires, step 416 adds the transmit group processed by steps 406 through 410 to the transmit queue. Step 418 restarts the transmit timer after which step 414 waits for this timer to expire and then adds the next group to the transmit queue. Concurrently with steps 412 to 418, the transmit process comprising steps 420 to 424 may be executed. Step 420 creates a transmit process. The transmit queue is a FIFO that step 422 examines to determine if there is a group in the queue. If a group is present in the queue, step 424 transmits the group and then step 422 determines if there is a next group in the queue. If a group is not present in the queue, step 422 waits until a group is placed in the queue from the process comprising steps 412 to 418.

The present invention optimizes available bandwidth by transmitting most requested information more frequently than less requested information. For example, if football scores are displayed in a lower portion of a television screen in response to viewer request, updates of scores for the most frequently requested teams may be displayed most often and scores of less requested teams may be displayed less often. Since cable systems are regional entities, viewers will likely most frequently request information for local teams, teams that may affect the standing of the local teams, and the like. Regional preferences for information may also apply to stock information.

Figure 5:
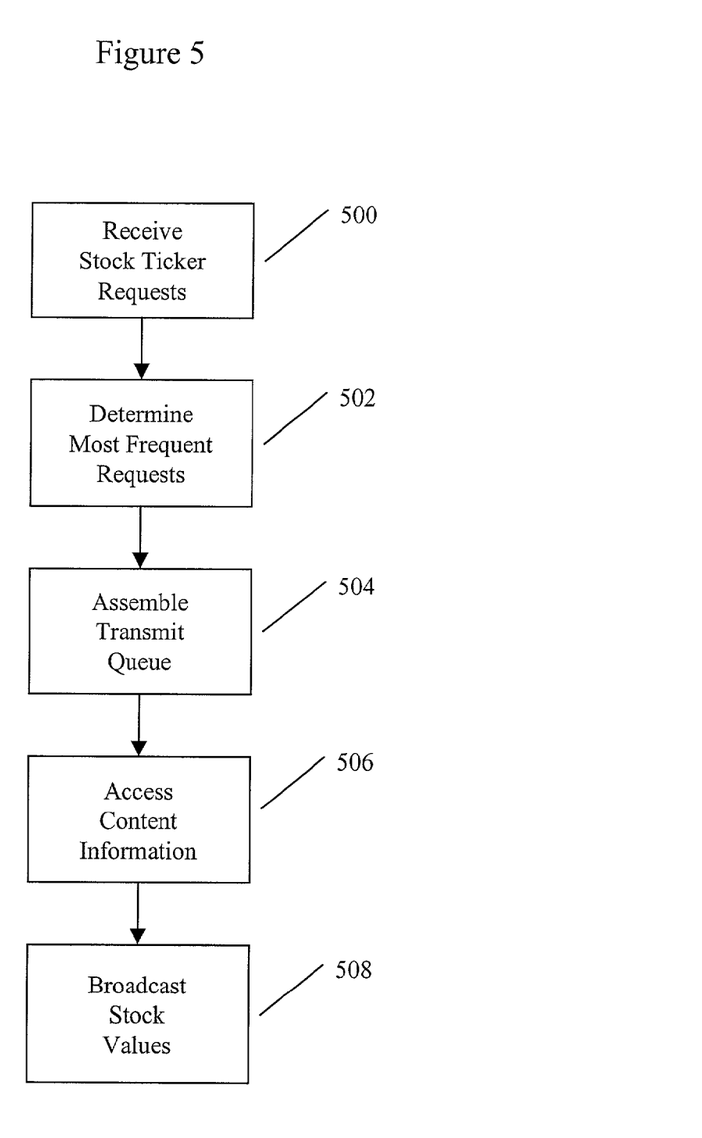
FIG. 5 is a flowchart of the method of the present invention as may be applied to displaying stock prices.

FIG. 5 is a flowchart of the method of the present invention as may be applied to displaying stock prices. At step 500, requests are received from viewers for prices of stock for a group of companies. If the cable system is located in a region that produces automobiles, for example, requests for automobile company stock prices may be most frequently received. At step 502, the most frequent requests are determined. The determination may include a time average of requests updated at a predetermined interval. At step 504, current information is accessed. Access may employ a query of network accessible databases. At step 506 a transmit queue is assembled. The transmit queue reflects the frequency of request such that, for example, stock prices for automobile companies may be displayed once every minute whereas stock prices for less frequently requested companies may be displayed every three minutes. At step 508 the stock prices are broadcast.

Figure 6:
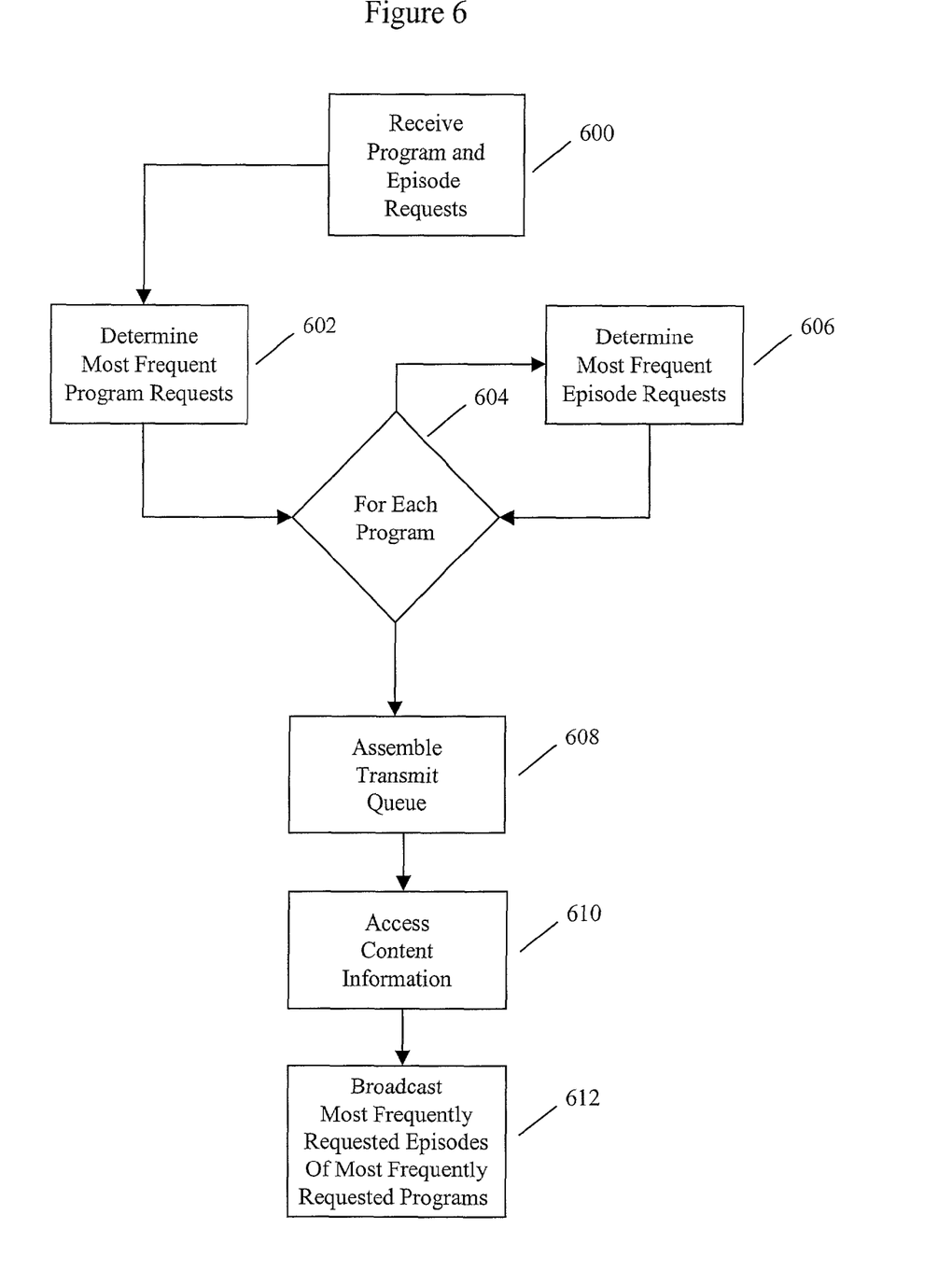
FIG. 6 depicts a method for applying the present invention to programs and program episodes.

In addition to optimizing utilization of system bandwidth for data services, the present invention may also be employed to optimize program broadcast bandwidth. For example, a broadcaster may offer a favorites weekend where favorite programs and favorite episodes of favorite programs are presented. The present invention may be employed in a tiered fashion such that a first implementation determines the frequency of request for types of programs and a second implementation determines the frequency of request for content of frequently requested programs. FIG. 6 depicts a method for applying the present invention to programs and program episodes. At step 600 requests for program episodes are received. At step 602 the most frequent program requests are determined. Steps 604 and 606 interoperate such that the most requested episodes for each of the most requested programs are determined. At step 608 a transmit queue is assembled. At step 610, content information is accessed, and at step 612 the most frequently requested episodes of most frequently requested programs are broadcast. The method illustrated in FIG. 6 may employ decision criteria such that if the vast majority of episode requests are for the same program, then a presentation may comprise episodes of that one program. Alternatively, decision criteria may be employed such that a variety of programs may be presented with the most requested episodes for each program. The method illustrated in FIG. 6 may also be employed to select between types of presentations, such as stock quotes, music charts, and sports scores, for example, wherein a first determination is used to establish a frequency of presentation, and a second determination may be employed to determine the frequency of presentation of information within each presentation type. The present invention may employ long term information to produce trend based program and item selection, or may employ short-term information to provide dynamic and real-time selection of broadcast content. Advantageously, the present invention provides for optimized viewer satisfaction while efficiently using available bandwidth by presenting most requested content, or most requested content types and most requested elements of those content types, at frequent intervals and presenting less requested content or less requested content types at less frequent intervals.

The foregoing description of the invention has been presented for purposes of illustration and description. It is not intended to be exhaustive or to limit the invention to the precise form disclosed, and other modifications and variations may be possible in light in the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A method for transmitting requested content items in a broadband transmission system comprising:
   receiving requests for a plurality of content items on an upstream path of the broadband transmission system;
   creating a list of the content items;
   creating a request count for each content item of the plurality of content items based on the requests received;
   sorting the requests using the count;
   determining an associated retransmit rate for each of the content items, the content items with a higher request count receiving a higher associated retransmit rate than content items with a lower request count, the retransmit rate indicating how often the content items should be retransmitted;
   grouping content items with a request count greater than or equal to a predetermined access count into a transmit group;

determining a group retransmit rate for the transmit group; and repeatedly broadcasting the transmit group at the group retransmit rate.

2. The method of claim 1, wherein the request count is a number of requests received during a predefined time period for each content item of the plurality of content items.

3. The method of claim 1, further comprising removing a content item from the list of content items if the request count is equal to or less than a predetermined content access count.

4. The method of claim 1, wherein the transmit group with a higher request count receives a higher associated group retransmit rate than a transmit group with a lower request count, the group retransmit rate indicating how often the transmit group should be retransmitted.

5. The method of claim 1, further comprising adding a content item of the plurality of content items to the content item list based on the content item not being in the content item list.

6. A method for optimizing transmit bandwidth utilization in a broadband transmission system employing a content item list, the method comprising:
    receiving requests on an upstream path of the broadband transmission system for transmission of a plurality of content items;
    adding a content item of the plurality of content items to the content item list based on the content item not being in the content item list;
    determining a rate of request for each content item contained in the content item list based on the requests received;
    deleting content items from the content list for which the number of requests during a predefined time are less than or equal to a predefined rate of request;
    determining an associated retransmit rate for each of the content items in the content item list, the content items with a higher request count receiving a higher associated retransmit rate than content items with a lower request count, the retransmit rate indicating how often the content items should be retransmitted; and
    repeatedly broadcasting the content items at the associated retransmit rate.

7. The method of claim 6, wherein the content items with a higher rate of request are transmitted more frequently than content items with a lower rate of request.

8. The method of claim 6, wherein the repeatedly broadcasting further comprises grouping a plurality of the content items into a transmit package wherein the transmit package is of a predetermined maximum size.

9. The method of claim 8, wherein the determining the associated retransmit rate for each of the content items comprises determining a group retransmit rate for the transmit package, the transmit package with a higher request count receiving a higher associated group retransmit rate than a transmit package with a lower request count, the group retransmit rate indicating how often the transmit package should be retransmitted.

10. The method of claim 7, wherein the repeatedly broadcasting further comprises merging the content items with other transmitted data.

11. A system for optimizing bandwidth utilization in a broadband transmission system, the system comprising:
    a first database containing a plurality of content items;
    a second database containing user request information for the content items;
    a transmit unit; and
    a software program that
        processes the user request information for the content items,
        determines a rate of request for each content item based on the user request information for each content item,
        determines an associated retransmit rate for each content item of the plurality of content items in the first database, the content items with a higher request count receiving a higher associated retransmit rate than content items with a lower request count, the retransmit rate indicating how often the content items should be retransmitted, and
        repeatedly broadcasts the content items via the transmit unit to a downstream requesting device based on the retransmit rate.

12. The system of claim 11, wherein the transmit unit comprises a television transmitter.

13. The system of claim 11, wherein the transmit unit comprises a server computer connected to a network.

14. The system of claim 11, further comprising a third database containing the content items corresponding to the user request information for the content items.

15. The system of claim 11, wherein the associated retransmit rate is further responsive to available bandwidth for content item broadcast.

16. The system of claim 11, wherein the associated retransmit rate is further responsive to a duration of each content item of the plurality of content items in the first database.

17. The system of claim 11, wherein the software program further groups content items with a request count greater than or equal to a predetermined access count into a transmit group.

18. The system of claim 17, wherein the software program further determines a group retransmit rate for the transmit group, the transmit group with a higher request count receiving a higher associated group retransmit rate than a transmit group with a lower request count, the group retransmit rate indicating how often the transmit group should be retransmitted, and wherein the software program further repeatedly broadcasts the transmit group at the group retransmit rate.

19. A system for transmitting requested content items in a broadband transmission system, the system comprising:
    means for receiving requests for a plurality of content items on an upstream path of the broadband transmission system;
    means for creating a request count for each content item of the plurality of content items based on the requests received;
    means for sorting the requests using the count;
    means for determining an associated retransmit rate for each of the content items, the content items with a higher request count receiving a higher associated retransmit rate than content items with a lower request count, the retransmit rate indicating how often the content items should be retransmitted;
    means for grouping content items with a request count greater than or equal to a predetermined access count into a transmit group;
    means for determining a group retransmit rate for the transmit group; and
    means for repeatedly broadcasting the transmit group at the group retransmit rate.

* * * * *

UNITED STATES PATENT AND TRADEMARK OFFICE
CERTIFICATE OF CORRECTION

PATENT NO. : 8,429,290 B2
APPLICATION NO. : 12/984413
DATED : April 23, 2013
INVENTOR(S) : Sedlak et al.

It is certified that error appears in the above-identified patent and that said Letters Patent is hereby corrected as shown below:

On the Title page, in column 2, under "Other Publications", line 1, delete "10/067,460 ," and insert --10/067,460,--, therefor On Title page 2, in column 2, under "Other Publications", line 6, delete "13." and insert --13 pgs.--, therefor On Title page 2, in column 2, under "Other Publications", line 23, delete "10/067,460" and insert --10/067,460,--, therefor In the Claims:

In column 7, line 58, in claim 10, delete "7," and insert --6,--, therefor

Signed and Sealed this
Twenty-fourth Day of September, 2013

Teresa Stanek Rea
*Deputy Director of the United States Patent and Trademark Office*